April 16, 1940.     H. MERSHEIMER     2,197,648
ENGINE HOOD FOR MOTOR VEHICLES
Filed April 19, 1938     2 Sheets-Sheet 1

Inventor
Hans Mersheimer
By Blackmore, Spencer & Flint
Attorneys

April 16, 1940.   H. MERSHEIMER   2,197,648
ENGINE HOOD FOR MOTOR VEHICLES
Filed April 19, 1938   2 Sheets-Sheet 2
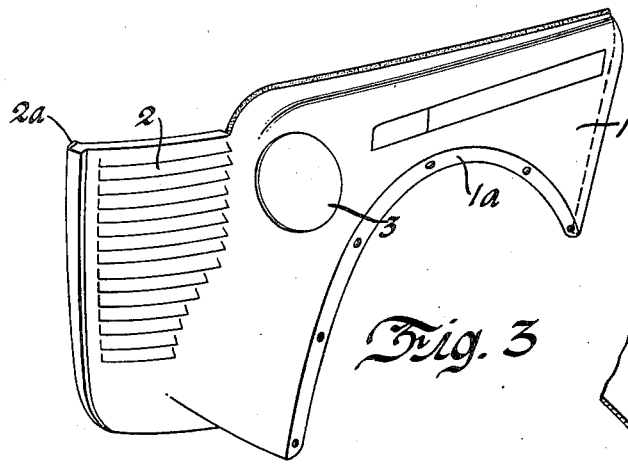
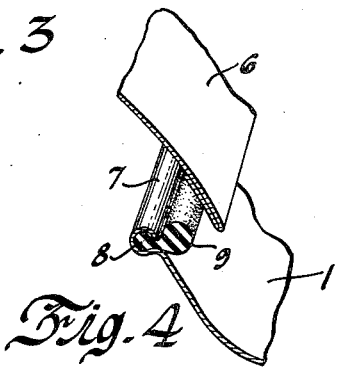
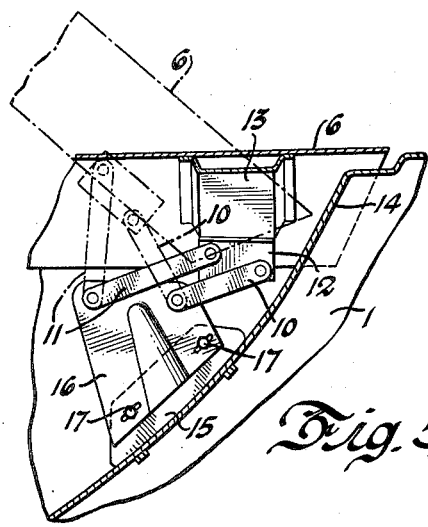
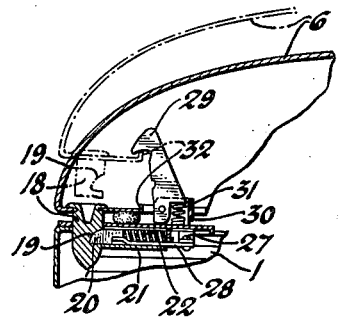
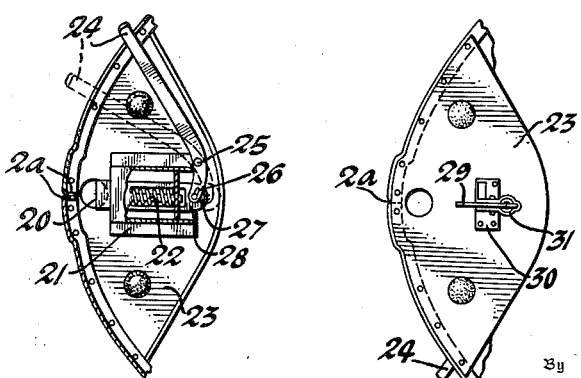
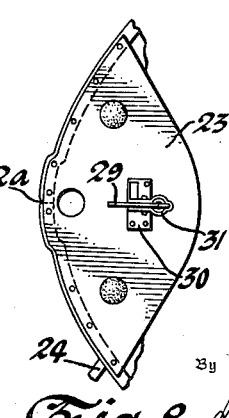
Inventor
Hans Mersheimer
By Blacemon, Spencer & Hink
Attorneys Patented Apr. 16, 1940

2,197,648

UNITED STATES PATENT OFFICE 2,197,648

ENGINE HOOD FOR MOTOR VEHICLES

Hans Mersheimer, Russelsheim-on-the-Main, Germany, assignor to General Motors Corporation, Detroit, Mich., a corporation of Delaware Application April 19, 1938, Serial No. 202,927
In Germany November 5, 1937

9 Claims. (Cl. 180—69)

This invention relates to motor hoods for motor vehicles and has reference to a hood which is provided with a swingable cover hinged at its rear end to the body of the vehicle. This structure distinguishes from known constructions in which the hinge for the motor hood is at the top center line of the vehicle and hinges each half of the hood. In order to have access to the motor or the parts under the hood, it is necessary to raise these lateral hood halves.

In the motor hoods of the prior art the sides of the hood and the radiator grille usually consist of a plurality of parts. The work which is necessary in constructing and assembling these parts is therefore very time-consuming and expensive. By means of the invention a decrease in the cost of production is brought about due to the fact that the hood is made of a less number of parts, that is to say, of two side walls only. These two side walls are each formed in one piece and comprise therewith one-half of the radiator grille. The cover or lid forms the third section of the motor hood. If desired, the two side walls and the radiator grille may be made in one piece, but this is regarded as somewhat disadvantageous because in case of automobile accidents it often happens that one side only of the grille is damaged, and according to the structure of the invention this side only then needs to be changed. The change is also made easier because the two parts are preferably secured together by means of screws or rivets only. They are secured at their rear edges to the vehicle body, at their lower edges to the front wheel housing, and are also united to each other at their extreme front edges. This construction enables the motor to be freely positioned from all sides.

Further improvements of the invention relate to the novel hinge which unites the cover of the hood with the vehicle body. This hinge consists of two pairs of links, the arms of which are of unequal length and which, when the door is raised, follow a nearly parallel position. As the result of this construction, the rear edge of the cover may lie beyond the cowl. The installation is accomplished in such a way that small differences in production are of no consequence in assembling the parts together.

The cover in its closed position is suitably provided with a snap lock which may be operated by an ordinary lever which extends outwardly through a slit in the radiator grille. In order to prevent the raising of the hood by the wind caused by the motion of the vehicle, in case the lock of the hood cover should not be caught, it is preferable to provide a special safety hook which may be released by an easy pressure of one's hand.

On the drawings—

Figure 3 is a perspective view in detail of one-half of the hood side and radiator grille.

Figure 4 shows on an enlarged scale the packing between the lateral hood wall and the hood cover.

Figure 5 shows a side view of the hinge which secures the cover to the vehicle body, and showing the cover in closed position.

Figure 6 is a vertical section through the catch at the front of the hood door.

Figure 7 is a bottom plan of the catch with parts broken away, clearer to illustrate the construction.

Figure 8 is a plan view of the metal sheet carrying the catch and the safety hook.

Figure 1:
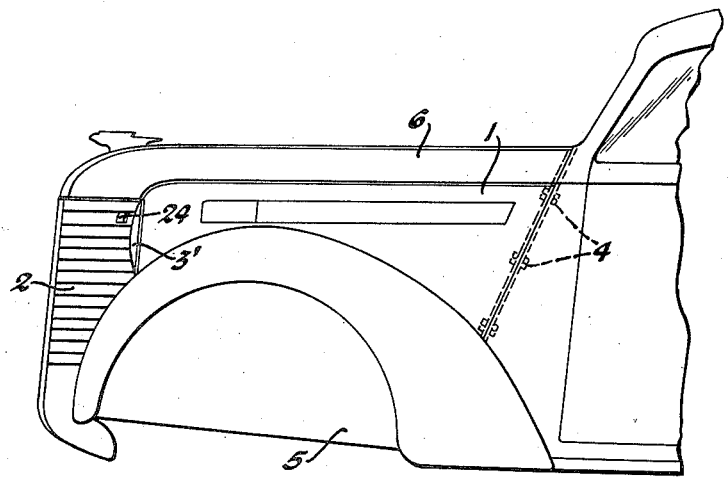
Figure 1 is a side view of the novel hood of the invention.
Figure 2:
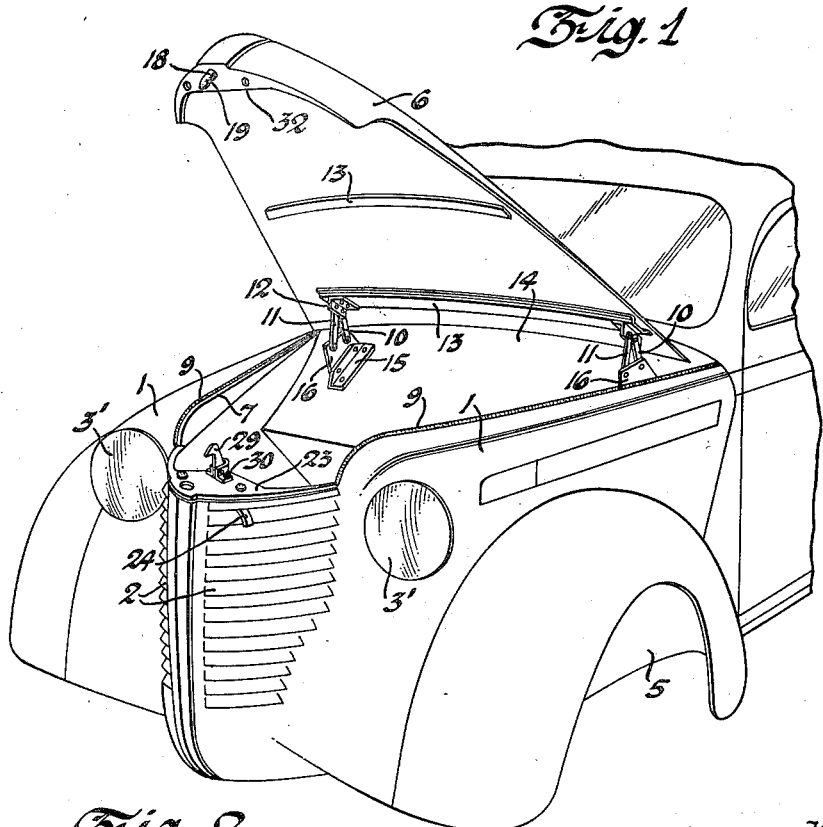
Figure 2 is a perspective view of the hood showing the cover or door in open position.

The motor hood is provided with the side parts 1, each of which has integrally formed therewith the half 2 of the radiator grille. These parts consist of a single metal stamping and in the illustrated species are provided with openings 3 to receive the headlamps 3' of the vehicle. The lateral walls, as shown in Figure 1, are secured at their rear edges to the vehicle body by means of screw bolts 4 and at their lower arcuate edges 1a to the front wheel housing 5. At their forward or meeting edges the grille halves are provided with mating flanges 2a by means of which the halves 2 are secured together. The motor is accessible when the door or cover 6 is raised and this cover is united to the vehicle body at its rear edge by means of hinges. The side walls of the cover extend over the upper edges of the lateral hood walls and in order to prevent any noises that are caused by contact between the metal parts while the vehicle is en route, the upper edges of the side walls are provided with a packing 9 the arrangement of which is to be seen in Figure 4. The upper edges of the side walls are provided with bent over parts 7 in which there is positioned in the manner shown one edge 8 of a packing strip 9.

The construction of the two hinges by means of which the cover is united to the body is shown in Figure 5. Each hinge consists of two links 10 and 11; one end of each link is united with a small bracket 12 which is fastened to a strengthening rib 13 on the cover, and at their other ends are pivotally attached to a bracket applied to the inclined part 14 of the cowl. The small bracket 12 applied to the door or cover consists of a simple angle iron. On the other hand, the small block attached to the cowl is formed of two pieces and consists of an angle iron 15 which is provided with a flange secured to the cowl, and a plate 16 which is united to the free flange of the angle iron by means of screw bolts 17. In order to obtain a close fit of the cover in spite of small dimensional differences in production, the plate 16 as well as the free flange of the angle iron 15 are provided with oblong holes whose longitudinal axes are arranged at right angles to each other. In this way it is possible always definitely to position the cover, having due regard for limitations imposed by production tolerances.

The latch construction which holds the cover in its locked position is best shown in Figures 6 and 7. This latch construction consists of a nose 18 applied to the cover and which is provided with a recess 19. The latch also comprises the latch bolt 20 which is pressed forwardly through a guide 21 by means of a spring 22. The guide 21 is fastened to a steel sheet 23 which is secured by means of screws or rivets at the upper bent over edge of the forepart of the radiator grille. The bolt 20 of the latch is provided at its forward edge with an inclined part so that, with the aid of the point on the end of the nose 18, it may be pressed rearwardly when the cover is lowered until it stands opposite the recess 19 in which it is forced by means of the spring 22. The release of the latch takes place through a lever 24 which is pivoted at 25 on the sheet 23. The lever is provided at its rear end with a slit 26 in which a finger 27 is received. The finger 27 operates in a prolongation 28 of the latch bolt 20. The other arm of the lever 24 passes outwardly through a slit in the radiator grille. When the lever is moved, the latch bolt is drawn rearwardly from the recess 19, against the action of the spring 22.

In order to prevent the accidental raising of the hood by the wind produced during the motion of the vehicle, in case the latch of the cover 6 should not catch when the hood is lowered, a safety hook 29 is provided. This hook is attached to a small bracket 30 secured to the metal sheet 23. This safety hook is actuated by a spring 31 and is brought into action against the rearwardly bent edge 32 of the cover 6 when an attempt is made to raise the cover. When it is desired to raise the cover, the hook 29 may be easily pressed rearwardly by applying hand pressure, which will release the cover and enable it to be raised.

I claim:

1. In a hood for automotive vehicles having a body, said hood having a door hinged at its rear to the body, side walls, radiator grille parts, one part integral with and extending forwardly of each of the side walls, means to secure the side walls at their rear ends to the automobile body, wheel housings, and means to secure the lower edges of the side walls to the wheel housings.

2. In a hood for automotive vehicles having a body, said hood having a door hinged at its rear to the body, side walls, radiator grille parts, one part integral with and extending forwardly of each of the side walls, means to secure the side walls at their rear ends to the automobile body, wheel housings, means to secure the lower edges of the side walls to the wheel housings, and means to secure the forward edges of the grille parts to each other.

3. In a hood for automotive vehicles having a body, said hood having a door hinged at its rear to the body, side walls, radiator grille parts, one part integral with and extending forwardly of each of the side walls, means to secure the side walls at their rear ends to the automobile body, wheel housings, means to secure the lower edges of the side walls to the wheel housings, a reflanged part on the upper edge of the side walls, and a packing strip secured in the reflanged part, said packing strip forming a weathertight closure with the cover when in closed position.

4. In a hood for automotive vehicles having a body, said hood having a door hinged at its rear to the body, side walls, radiator grille parts, one part integral with and extending forwardly of each of the side walls, said grille parts having a plurality of openings for the admission of air, means to secure the side walls at their rear ends to the automobile body, wheel housings, and means to secure the lower edges of the side walls to the wheel housings.

5. In a hood for automotive vehicles having a body, said hood having a door hinged at its rear to the body, side walls, radiator grille parts, one part integral with and extending forwardly of each of the side walls, means at the front of each side part for the mounting of a headlamp, means to secure the side walls at their rear ends to the body, wheel housings, and means to secure the lower edges of the side walls to the wheel housings.

6. In a hood for automotive vehicles having a body, said hood having a door hinged at its rear to the body, side walls, radiator grille parts, one part integral with and extending forwardly of each of the side walls, means to secure the side walls at their rear ends to the automobile body, wheel housings, means to secure the lower edges of the side walls to the wheel housings, mating flanges on the grille parts, and means to secure the grille parts together at their flanges.

7. In a hood for automotive vehicles having a body, said hood having a door hinged at its rear to the body, side walls, radiator grille parts, one part integral with and extending forwardly of each of the side walls, means to secure the side walls at their rear ends to the automobile body, wheel housings, means to secure the lower edges of the side walls to the wheel housings, and a plate over the grille parts and secured to both to secure the grille parts together.

8. In a motor housing for an automotive vehicle having a body, a door hinged at its rear to the body and adapted to form the cover for the housing, side walls extending upwardly to the door and with the door adapted to form a housing, a grille at the front of said walls, a catch mounted on the grille and adapted to engage and hold the door in lowered position, and a handle extending through the louvers and accessible from the front of the vehicle to operate the catch.

9. In a motor housing for an automotive vehicle having a body, a door hinged at its rear to the body and adapted to form a cover for the housing, side walls extending upwardly to the door and with the door forming the housing, curved front extensions on the walls, the ends of said extensions meeting and abutting to form the front of the housing, said extensions having louvers, a catch adapted to engage and hold the door in lowered position, means to mount the catch on the extensions, and means extending through the louvers and accessible from the front of the vehicle to operate the catch.

HANS MERSHEIMER.